United States Patent
Balmakhtar et al.

(10) Patent No.: US 12,323,990 B2
(45) Date of Patent: Jun. 3, 2025

(54) MEMORY ACCESS FOR A USER APPLICATION IN A WIRELESS COMMUNICATION DEVICE

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 448 days.

(21) Appl. No.: 17/706,829

(22) Filed: Mar. 29, 2022

(65) Prior Publication Data

US 2023/0319831 A1 Oct. 5, 2023

(51) Int. Cl.
*H04W 72/23* (2023.01)
*H04W 72/0453* (2023.01)
*H04W 72/51* (2023.01)

(52) U.S. Cl.
CPC ....... *H04W 72/23* (2023.01); *H04W 72/0453* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 8,775,757 B2 | 7/2014 | Polzin et al. | |
| 9,161,227 B1 | 10/2015 | Bye et al. | |
| 9,489,512 B2 | 11/2016 | Thom et al. | |
| 9,667,629 B2 | 5/2017 | Tofighbakhsh | |
| 9,769,854 B1 | 9/2017 | Paczkowski et al. | |
| 10,007,574 B2 | 6/2018 | Grube et al. | |
| 10,044,572 B1 | 8/2018 | Marquardt et al. | |
| 10,440,096 B2 | 10/2019 | Sabella et al. | |
| 10,743,259 B2 | 8/2020 | Tofighbakhsh et al. | |
| 10,771,468 B1* | 9/2020 | Walker | H04L 63/0281 |
| 11,107,047 B2 | 8/2021 | Kim et al. | |
| 11,108,637 B1 | 8/2021 | Paczkowski et al. | |
| 2012/0144202 A1* | 6/2012 | Counterman | H04L 63/0876 |
| | | | 713/176 |
| 2015/0310434 A1* | 10/2015 | Cheung | G06Q 20/3224 |
| | | | 705/44 |
| 2018/0025148 A1* | 1/2018 | Jain | G06F 21/35 |
| | | | 713/166 |
| 2018/0198786 A1* | 7/2018 | Shah | H04W 12/069 |

(Continued)

*Primary Examiner* — Jason E Mattis
*Assistant Examiner* — Bao G Nguyen

(57) ABSTRACT

A wireless communication device serves a user application from a protected memory region. Processing circuitry receives a memory call from the user application for the protected memory region. In response, the processing circuitry generates network signaling that characterizes the memory call and authorization factors for the memory call. Communication circuitry wirelessly transfers the network signaling and receives other network signaling that indicates a memory instruction. The processing circuitry directs the memory circuitry to perform the memory call in the protected memory region for the user application per the memory instruction. The memory circuitry performs the memory call in the protected memory region for the user application per the memory instruction.

20 Claims, 9 Drawing Sheets

(56) References Cited

U.S. PATENT DOCUMENTS

| | | | |
|---|---|---|---|
| 2019/0069123 A1* | 2/2019 | Vincent | H04W 4/70 |
| 2021/0067365 A1 | 3/2021 | Ansari et al. | |
| 2022/0377514 A1* | 11/2022 | Balmakhtar | H04W 4/50 |
| 2023/0259603 A1* | 8/2023 | Young de la Sota | G06F 9/30101 726/20 |

* cited by examiner

MEMORY ACCESS FOR A USER APPLICATION IN A WIRELESS COMMUNICATION DEVICE

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Unified Data Management (UDMs), User Plane Functions (UPFs), and the like. Some of the network elements are grouped into wireless network slices that are typically optimized for a specific user applications like low-latency and IoT.

The wireless user devices have processing circuitry, memory circuitry, and communication circuitry. The memory circuitry stores an operating system, user data, user applications, and network applications. The processing circuitry executes the operating system and the user applications. The user applications place memory calls to the operating system, and the operating systems control the memory circuitry to read or write data for the user applications from/to the memory circuitry per the memory call. Some of the user applications may be rogue or become corrupted. These rogue/corrupt applications may attempt to steal user data by reading user data from the memory circuitry and transferring the stolen user data to a data thief over the communication circuitry. The rogue/corrupt applications may attempt to destroy user data by writing dummy data over the user data in the memory circuitry.

Unfortunately, the wireless user devices do not effectively protect against data theft and destruction by rogue/corrupt user applications. Moreover, the wireless user devices do not efficiently use wireless communication networks to protect their memory circuitry from data theft and destruction by the rogue/corrupt user applications.

Technical Overview

A wireless communication device serves a user application from a protected memory region. Processing circuitry receives a memory call from the user application for the protected memory region. In response, the processing circuitry generates network signaling that characterizes the memory call and authorization factors for the memory call. Communication circuitry wirelessly transfers the network signaling and receives other network signaling that indicates a memory instruction. The processing circuitry directs the memory circuitry to perform the memory call in the protected memory region for the user application per the memory instruction. The memory circuitry performs the memory call in the protected memory region for the user application per the memory instruction.

DETAILED DESCRIPTION

Figure 1:
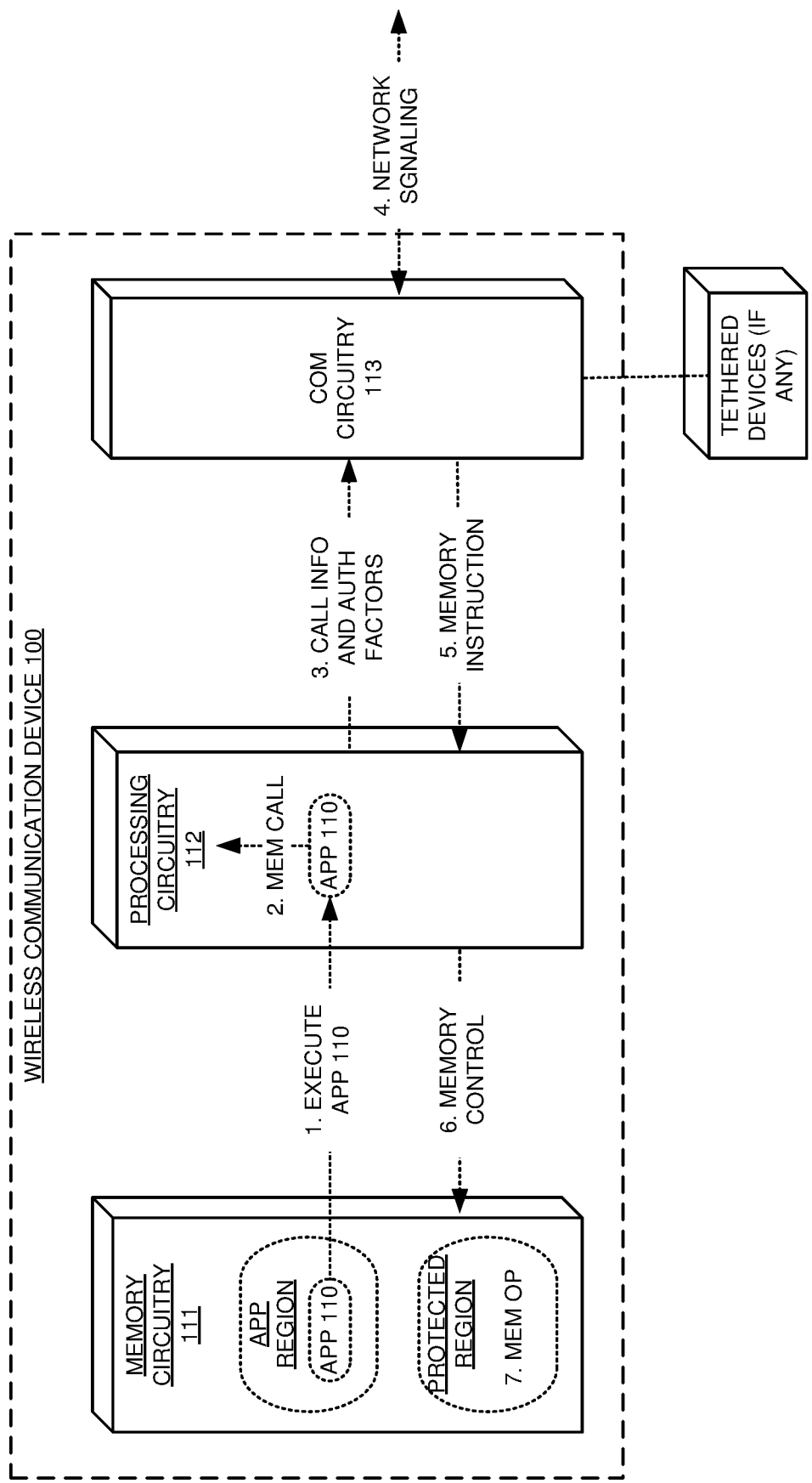
FIG. 1 illustrates an exemplary wireless communication device to serve a user application from a protected memory region.

FIG. 1 illustrates exemplary wireless communication device 100 to serve user application 110 from a protected memory region. Wireless communication device 100 comprises memory circuitry 111, processing circuitry 112, and communication (COM) circuitry 113. Memory circuitry 111 comprises an application (APP) region and a protected region. Processing circuitry 112 retrieves user application 110 from the application region in memory circuitry 111. Processing circuitry 112 executes user application 110. Processing circuitry 112 allows user application 110 to access to the application region in memory circuitry 111. Processing circuitry 112 obtains external authorization over communication circuitry 113 before allowing user application 110 to access the protected region in memory circuitry 111. Wireless communication device 100 may be wirelessly linked to tethered devices that use circuitry 111-113 to communicate with other data systems—effectively using device 100 as a data relay.

Various examples of network operation and configuration are described herein. In some examples, processing circuitry 112 retrieves user application 110 from the protected memory region and executes user application 110 (operation #1). Application 110 generates a memory (MEM) call for the protected region and transfers the memory call to processing circuitry 112 (operation #2). Processing circuitry 112 generates information (INFO) that characterizes the memory call and that indicates authorization factors for the memory call. The authorization factors will be processed externally to control access by user application 110 to the protected region of memory circuitry 111. Exemplary authorization factors comprise: digital certificates from user application 110, a history of memory calls from user application 110 for the protected memory region, a current geographic location of wireless communication device 100, a history of geographic locations for wireless communication device 100, indications of other data devices that are currently tethered to wireless communication device 100, a history of device-tethering to wireless communication device 100, network connections that are currently active for wireless communication device 100, a history of network connections for wireless communication device 100, and/or some other data.

Processing circuitry 112 transfers the call information and authorization factors to communication circuitry 113 (operation #3). Communication circuitry 113 wirelessly transfers network signaling that transports the call information and authorization factors (operation #4). In some examples, the network signaling comprises Third Generation Partnership Project (3GPP) N1, Non-Access Stratum (NAS), or Internet Protocol Security (IPSEC) signaling. A wireless communication network or some other data system (not shown) processes the call information and authorization factors to determine whether to authorize user application 110 for the memory call or for some alternative memory operation. Communication circuitry 113 wirelessly receives network signaling that transports a memory instruction that is based on the external determination. Communication circuitry 113 transfers the memory instruction to processing circuitry 112 (operation #5). In this example, processing circuitry 112 directs memory circuitry 111 to perform the memory call in the protected memory region for user application 110 per the memory instruction (operation #6). Memory circuitry 111 performs the memory call in the protected memory region for user application 110 per the memory instruction (operation #7). In other examples, processing circuitry 112 blocks the memory call or implements an alternative memory call for user application 110 per the memory instruction.

Advantageously, wireless communication device 100 effectively protects against data theft and destruction by user application 110. Moreover, wireless communication device 100 may efficiently use a wireless communication network to protect their memory circuitry from data theft and destruction by the rogue/corrupt user applications.

Communication circuitry 113 and the wireless communication network (or other data system) wirelessly communicate using a wireless protocol like Fifth Generation New Radio (5GNR), Institute of Electrical and Electronic Engineers (IEEE) 802.11 (WIFI), Long Term Evolution (LTE), Bluetooth Low Energy (BLE), Internet-of-Things (IoT), Low-Power Wide Area Network (LP-WAN), or the like. In wireless communication device 100, circuitry 111-113 comprises microprocessors, software, memories, transceivers, radios, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication device 100 as described herein.

Figure 2:
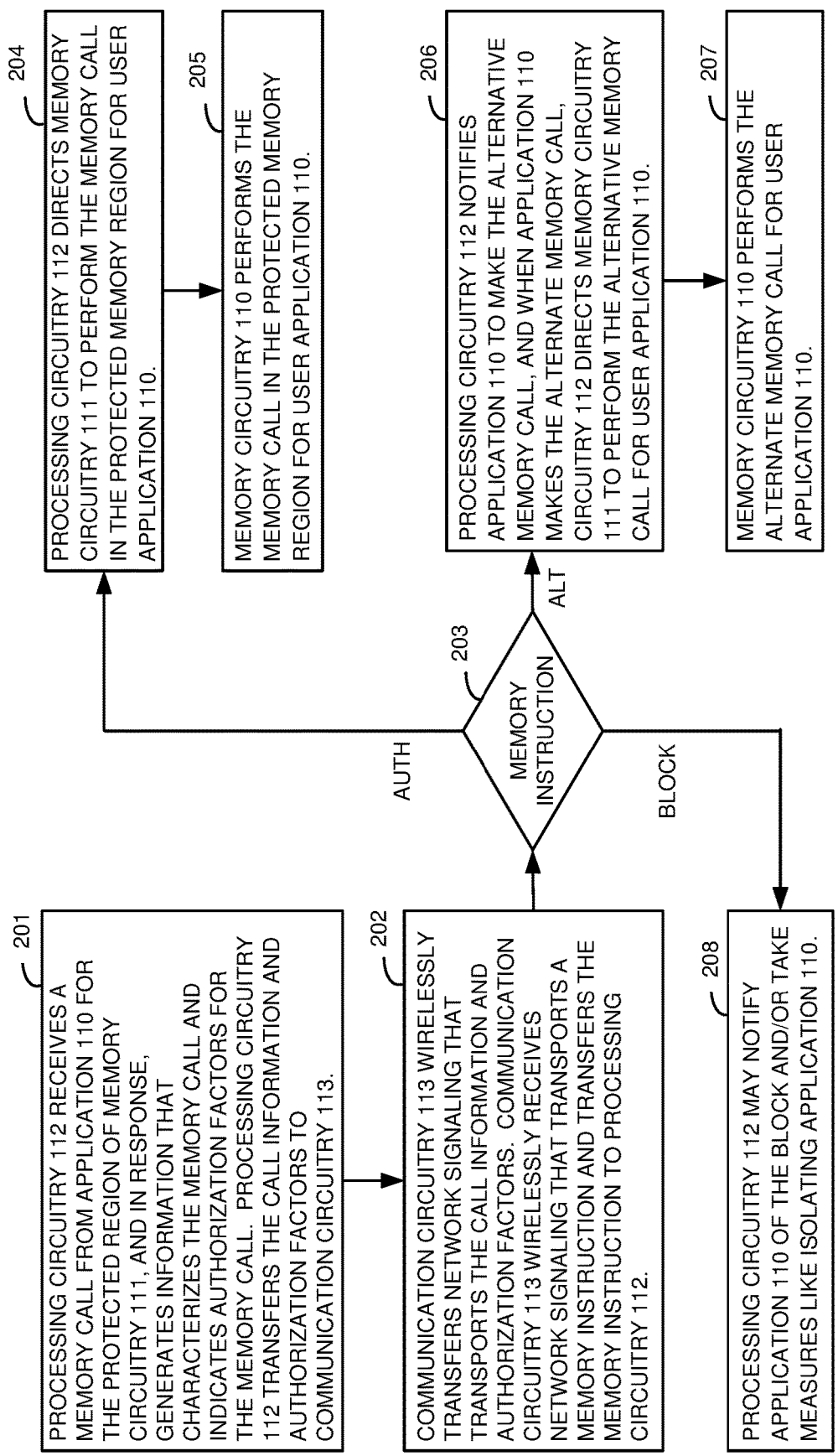
FIG. 2 illustrates an exemplary operation of the wireless communication device to serve the user application from the protected memory region.

FIG. 2 illustrates an exemplary operation of wireless communication device 100 to serve user application 110 from the protected memory region. The operation may differ in other examples. Processing circuitry 112 receives a memory call from user application 110 for the protected region of memory circuitry 111, and in response, generates information that characterizes the memory call and indicates authorization factors for the memory call (201). Exemplary authorization factors for user application 110 comprise: digital certificates, memory call history to the protected memory region, current and historical geographic locations of wireless communication device 100, current and historical device tethering to wireless communication device 100, current and historical network connections for wireless communication device 100, network connection history for wireless communication device 100, and/or some other device data. Processing circuitry 112 transfers the call information and authorization factors to communication circuitry 113 (201).

Communication circuitry 113 wirelessly transfers network signaling that transports the call information and authorization factors (202). Communication circuitry 113 wirelessly receives network signaling that transports a memory instruction and transfers the memory instruction to processing circuitry 112 (202). When the memory instruction authorizes (AUTH) the memory call (203), processing circuitry 112 directs memory circuitry 111 to perform the memory call in the protected memory region for user application 110 (204). Memory circuitry 111 performs the memory call in the protected memory region for user application 110 (205). When the memory instruction authorizes an alternate (ALT) memory call (203), processing circuitry 112 notifies application 110 to make the alternative memory call, and when application 110 makes the alternate memory call, processing circuitry 112 directs memory circuitry 111 to perform the alternative memory call for user application 110 (206). Memory circuitry 111 performs the alternate memory call for user application 110 (207). When the memory instruction blocks the memory call (203), processing circuitry 112 may notify application 110 of the block and/or take measures like isolating application 110 (208).

Figure 3:
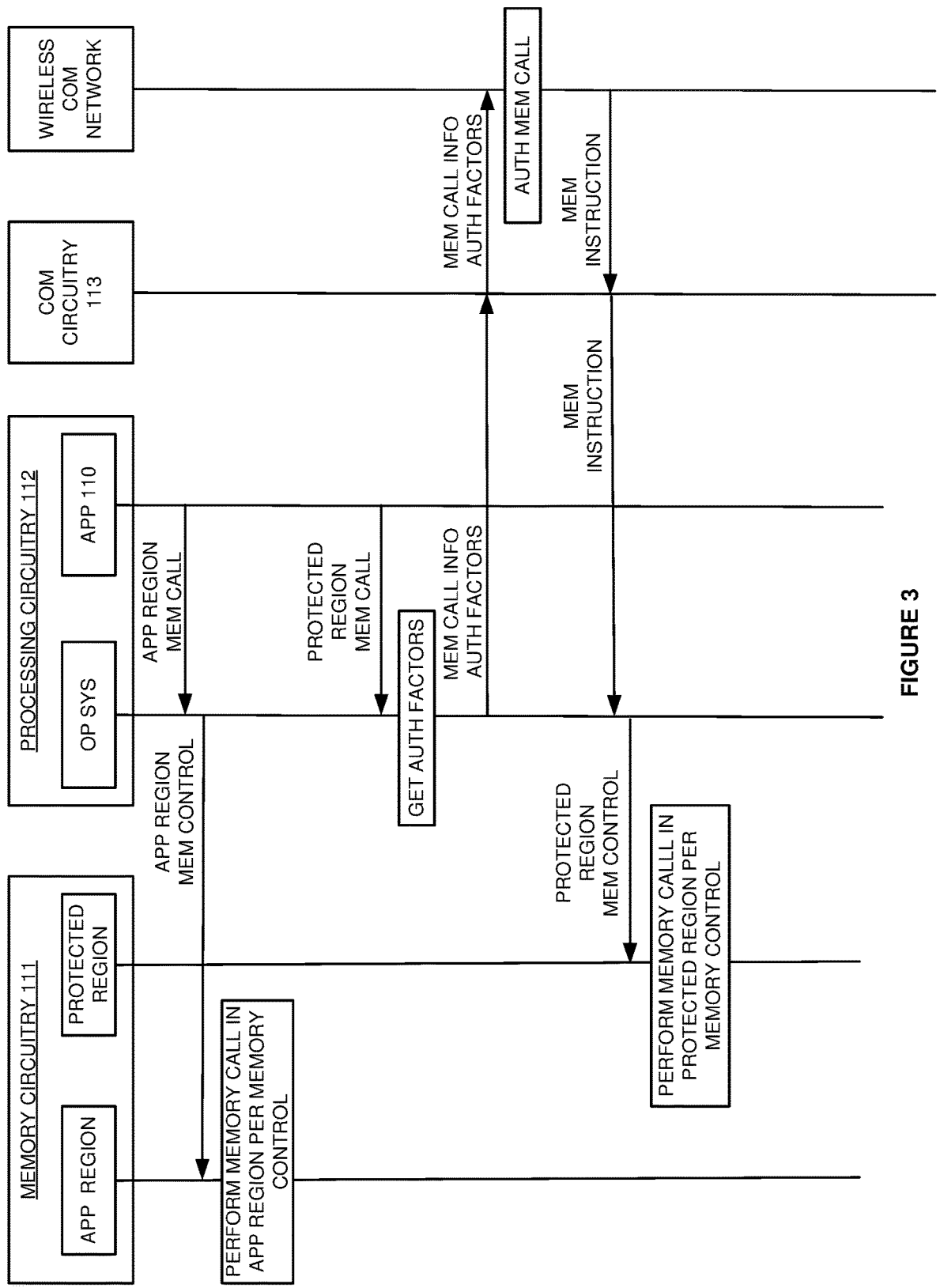
FIG. 3 illustrates an exemplary operation of the wireless communication device to serve the user application from the protected memory region.

FIG. 3 illustrates an exemplary operation of wireless communication device 100 to serve user application 110 from the protected memory region. The operation may differ in other examples. User application 110 generates a memory call for the application memory region and transfers the memory call to processing circuitry 112. Since user application 110 is authorized to access the application region of memory circuitry 111, processing circuitry 112 directs memory circuitry 111 to perform the memory call in the application memory region for user application 110. Memory circuitry 111 performs the memory call in the application memory region for user application 110.

Application 110 now generates a memory call for the protected memory region and transfers the memory call to processing circuitry 112. In response to the memory call from user application 110 for the protected memory region, processing circuitry 112 first obtains external authorization. Processing circuitry 112 generates information that characterizes the memory call and that indicates authorization factors for the memory call. Exemplary authorization factors for user application 110 comprise: digital certificates, memory calls for the protected memory region, geographic locations, device tethering, network connections, and/or some other data. Processing circuitry 112 transfers the call information and authorization factors to communication circuitry 113. Communication circuitry 113 wirelessly transfers network signaling that transports the call information and authorization factors to a wireless communication network. The network signaling may comprise 3GPP N1, NAS, IPSEC, or some other signaling protocol. The wireless communication network processes the call information and authorization factors to determine whether to authorize user application 110 for the memory call or for some alternative memory operation. In this example, the wireless communication network authorizes the memory call. In other examples, the wireless communication network may block or modify the memory call.

Communication circuitry 113 wirelessly receives network signaling that transports a memory instruction that is based on the network authorization. Communication circuitry 113 transfers the memory instruction to processing circuitry 112. Processing circuitry 112 directs memory circuitry 111 to perform the memory call in the protected memory region for user application 110 per the memory instruction. Memory circuitry 111 performs the memory call in the protected memory region for user application 110 per the memory instruction.

Figure 4:
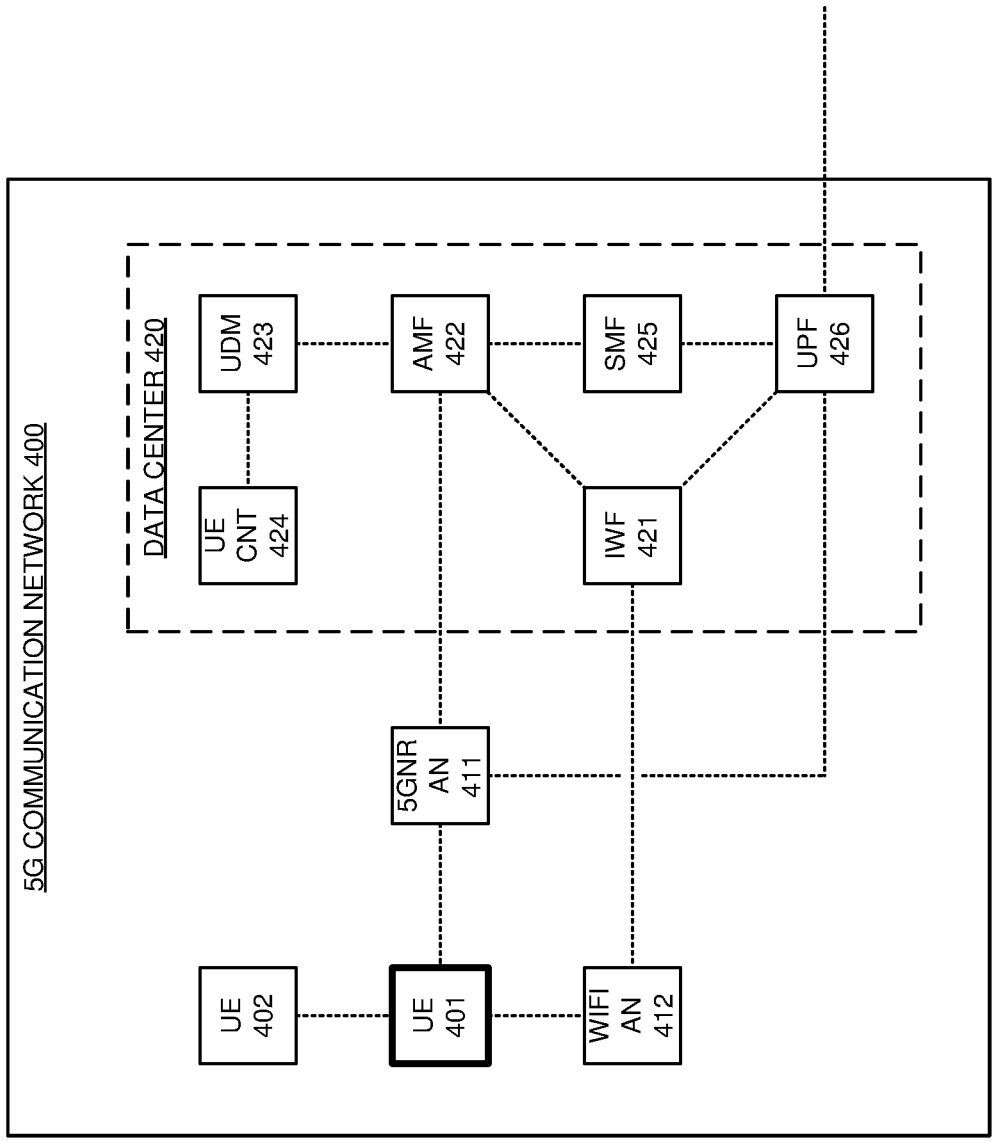
FIG. 4 illustrates an exemplary Fifth Generation (5G) communication network that comprises a wireless User Equipment (UE) to serve a user application from a protected memory region.

FIG. 4 illustrates exemplary Fifth Generation (5G) communication network 400 that comprises wireless User Equipment (UE) 401 to serve a user application from a protected memory region. 5G communication network 400 comprises an example of wireless communication network 100, although network 100 may differ. 5G communication network 400 comprises: UEs 401-402, 5GNR AN 411, WIFI AN 412, and network data center 420. UE 402 is tethered to UE 401 and uses UE 401 to relay data communications with 5G communication network 400. Network data center 420 comprises Interworking Function (IWF) 421, Access and Mobility Management Function (AMF) 422, Unified Data Management (UDM) 423, UE controller (CNT) 424, Session Management Function (SMF) 425, and User Plane Function (UPF) 426. Network data center 420 typically includes additional network functions like Network Exposure Function (NEF) and Network Repository Function (NRF) that are omitted for clarity.

In this example, UE 401 and AMF 421 communicate over 3GPP N1 signaling, although NAS, IPSEC, or some other signaling protocol may be used in other examples. In response to a memory call to a protected memory region, UE 401 transfers information that characterizes the memory call and authorization factors to AMF 421 in N1 signaling that traverses 5GNR AN 411 or WIFI AN 412 and IWF 421. AMF 421 transfers the information that characterizes the memory call and authorization factors to UDM 423. UDM 423 transfers the information that characterizes the memory call and indicates the authorization factors to UE controller 424.

UE controller 424 features an Artificial Intelligent (AI) network that has inputs for the authorization factors. Digital certificates that were used by the user application are verified and scored by age and issuer. More recent certificates from trusted entities score higher than old certificates from an unknown authority. The memory calls from the user application for the protected memory region are processed to detect and score calls based on call history and the location. When the current memory call fits into an expected sequence of calls—especially at the location and/or time—then the score is higher than an unexpected memory call at an unusual location or time. The geographic locations for UE 401 are processed to detect and score locations based on history and location information. When the current location call fits into an expected sequence of locations—especially at the time—then the score is higher than an unexpected location or risky location that may have a negative score. The tethering information for UE 401 is processed to detect and score tethered devices based on history and location. No tethered devices may get the best score. Tethered devices with a consistent tethering history score higher than unknown tethered devices which may have a negative score. The network connections for UE 401 are processed to detect and score network activity based on history and location. When the network connections fit into an expected sequence of connections—especially at the location and/or time—then the score is higher than an unexpected network connection at an unusual location or time.

The various scores are aggregated and compared to a threshold for the requested memory call. A table may be used to translate memory call type, call origin, and call target into a score threshold. The memory call is authorized when the aggregate score exceeds the threshold. When the aggregate score falls below the threshold, an alternative memory call may be authorized or the authorization may be denied. Other AI techniques could be used instead of the aggregate scoring method in this example. UE controller 424 generates a memory instruction based on the AI result and transfers the memory instruction to UDM 423. The memory instruction has an expiration time when a new memory instruction would need to be obtained. UDM 423 transfers the memory instruction to AMF 422. AMF 422 transfers the memory instruction to UE 401 over N1 signaling that traverses 5GNR AN 411 or IWF 421 and WIFI AN 412. UE 401 implements the memory call per the memory instruction.

Figure 5:
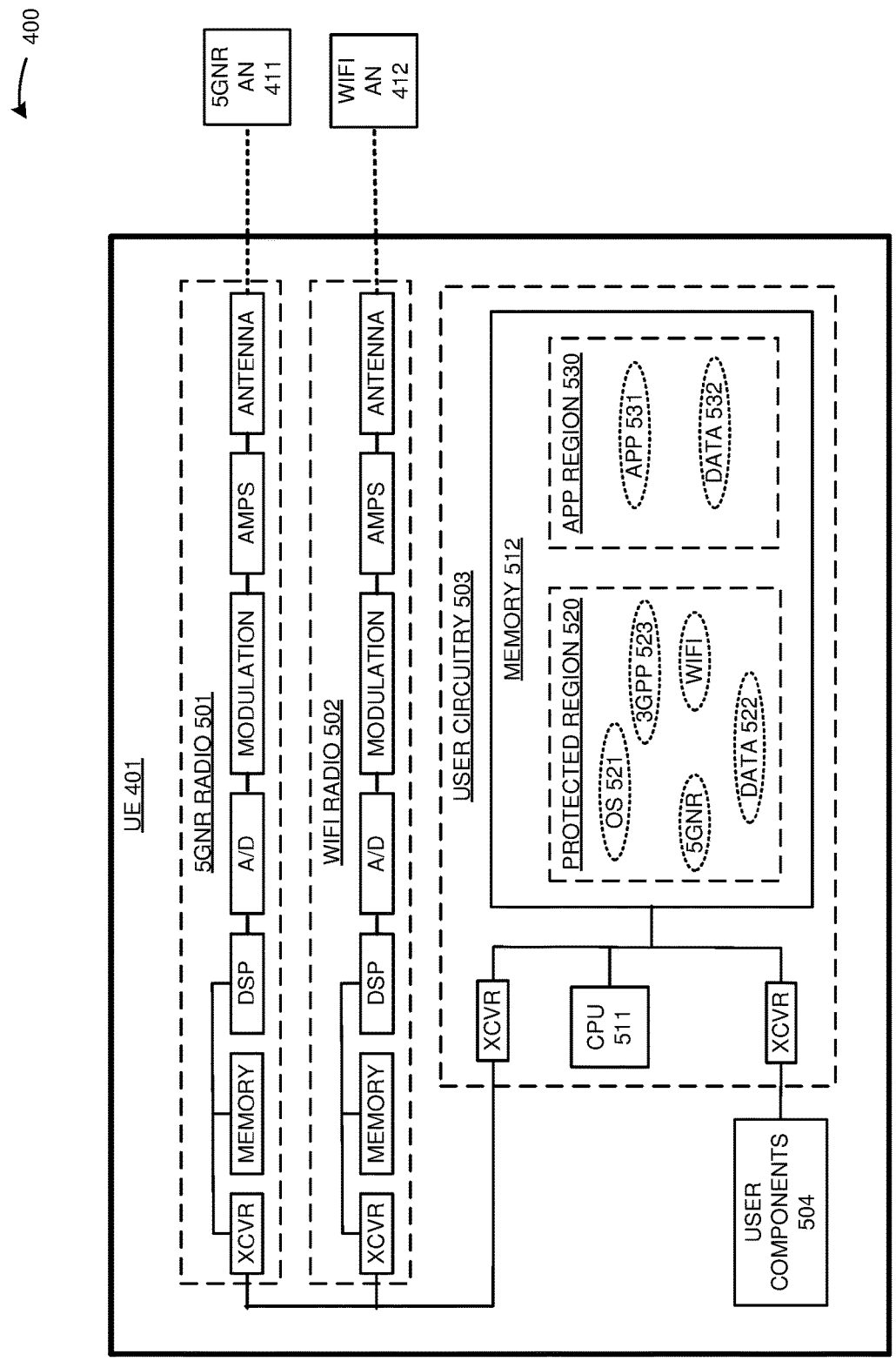
FIG. 5 illustrates an exemplary wireless UE in the 5G communication network.

FIG. 5 illustrates exemplary wireless UE 401 in 5G communication network 400. Wireless UE 401 comprises an example of wireless communication device 100 and UE 402, although device 100 and UE 402 may differ. Wireless UE 401 comprises 5GNR radio 501, WIFI radio 502, user circuitry 503, and user components 504. User components 504 comprise sensors, controllers, displays, or some other user apparatus that generates and/or consumes user data. Radios 501-502 each comprise an antenna, amplifiers, filters, modulation, analog-to-digital interfaces, DSP, memory, and transceivers that are coupled over bus circuitry. User circuitry 503 comprises CPU 511, memory 512, and transceivers (XCVRs) that are coupled over bus circuitry. Memory 512 in user circuitry 503 comprises protected region 520 and app region 530. Protected region 520 stores operating system (OS) 521, 5GNR application (5GNR), WIFI application (WIFI), network application (3GPP) 523, and protected data 522. The transceivers in radios 501-502 are coupled to a transceiver in user circuitry 503. The transceiver in user circuitry 503 is coupled to user components 504. CPU 511 in user circuitry 503 executes operating system 521 and the network applications to exchange network signaling and user data with ANs 411-412 over radios 501-502. OS 521 controls access to protected region 520 by user application 531 as described herein. 3GPP 523 exchanges N1 signaling with AMF 422 that has memory call information, authorization factors, and memory instructions as described herein.

When UE 401 is powered-up, CPU 511 and memory 512 execute boot code that drives the exchange and validation of hardware identifiers. The validation typically entails the hash of a hardware-embedded code with a random number challenge to generate a result that is compared to the expected result with that random number. Hardware-trust may be established between CPU 511 and radios 501-502 in a similar manner. Once hardware-trust is established between CPU 520 and memory 512, CPU 511 retrieves operating system 521 from memory 512 and executes operating system 521. OS 521 drives memory 512 to create protected region 520 and application region 530. OS 521 directs memory 512 to store OS 521, 3GPP 523, the 5GNR application, and the WIFI application in protected region 520. Over time, operating system 521 directs memory 512 to store protected data 522 in protected region 520 in memory 512.

Operating system 521 directs CPU 511 to execute 3GPP 523. 3GPP 523 registers with AMF 421 over the 5GNR application, 5GNR radio 501, and 5GNR AN 411. 3GPP 523 also registers with AMF 421 over the WIFI application, WIFI radio 502, WIFI AN 411, and IWF 421. The UE/AMF registrations entail Subscriber Identification Module (SIM) authentication of UE 401 by AMF 421. 3GPP 523 validates a digital certificate from AMF 421 to authenticate 5G communication network 400. 3GPP 523 and AMF 421 establish N1 signaling links over the WIFI and 5GNR data paths.

Eventually, OS 521 directs CPU 511 to retrieve user application 531 from application region 430 and execute user application 531. User application 531 transfers a memory call to operating system 521 to read protected data 522 from protected memory region 520. Operating system 521 requires network authorization before unauthorized applications may access protected memory region 520. Operating system 521 may classify applications and handle memory access for user application 531 based on its application class. In response to the read call from unauthorized user application 531 for protected memory region 520, operating system 521 gathers authorization factors that are dynamically maintained in a data store. The factors indicate: digital certificates used by user application 531, memory calls from user application 531 for protected memory region 520, geographic locations for UE 401, tethered UE 402 to UE 401, and network connections for UE 401. Operating system 531 transfers information that characterizes the memory call and that indicates the authorization factors to 3GPP 523. 3GPP 523 transfers the information that characterizes the memory call and that indicates the authorization factors to AMF 421 in N1 signaling that traverses 5GNR AN 411 or WIFI AN 412 and IWF 421. In response, AMF 422 transfers a memory instruction to 3GPP 523 over N1 signaling that traverses 5GNR 411 or IWF 421 and WIFI AN 412. 3GPP 523 transfers the memory instruction to operating system 521. When authorized by the memory instruction, operating system 521 transfers memory control to memory circuitry 512 to implement the memory call and instructs user application 531 on the authorized call. For a read call, memory circuitry 512 transfers protected data 522 from protected memory region 520 to user application 531. For a write call, user application 531 transfers new data to overwrite protected data 522 in protected memory region 520. When the call is not authorized, operating system 521 blocks the call and may recommend an alternative call.

Figure 6:
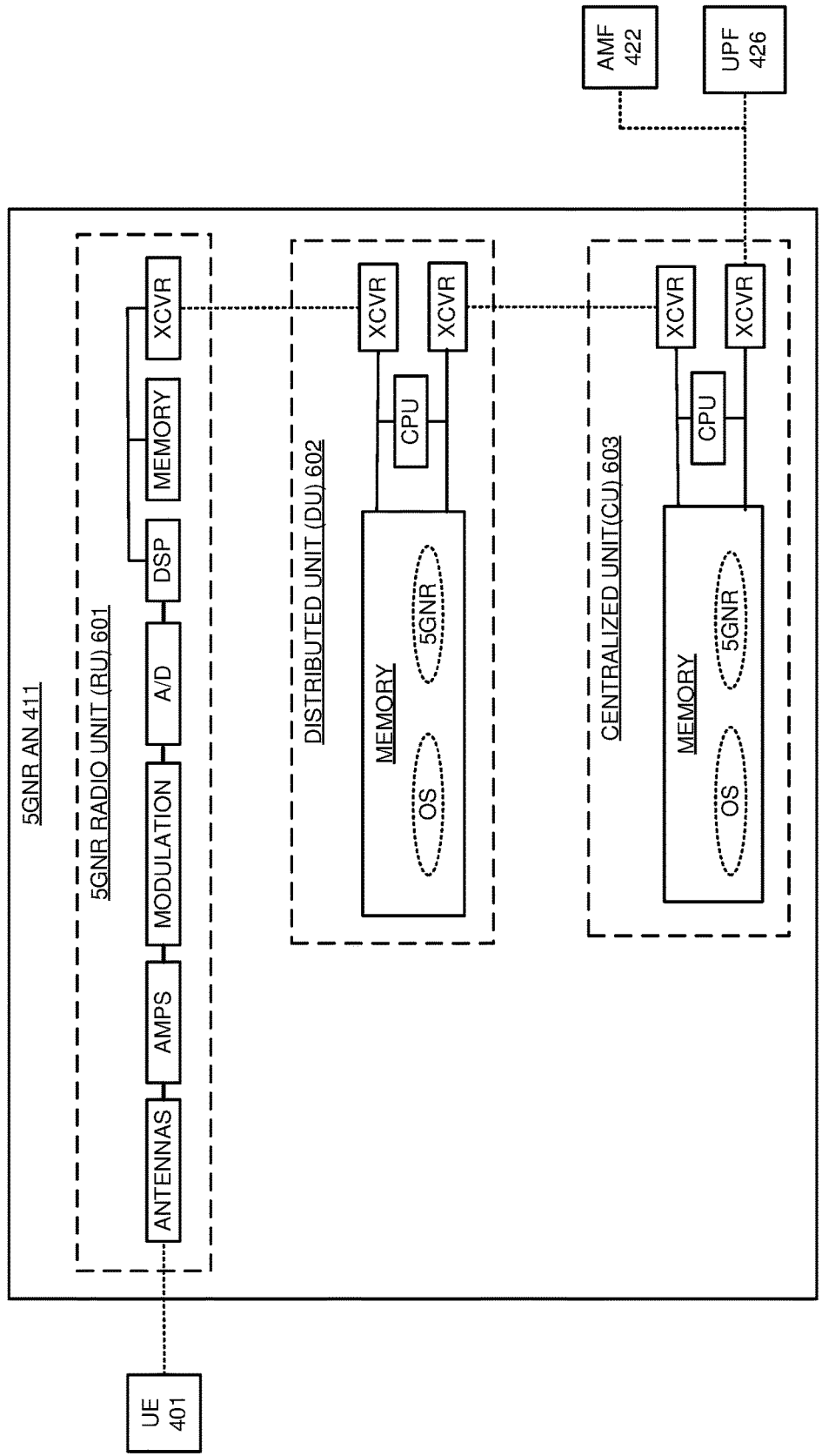
FIG. 6 illustrates an exemplary 5G New Radio (NR) Access Node (AN) in the 5G communication network.

FIG. 6 illustrates exemplary 5G New Radio (NR) Access Node (AN) 411 in 5G communication network 400. 5GNR AN 411 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to wireless UE 401 over a 5GNR link. Transceivers in 5GNR RU 601 are coupled to transceivers in DU 602. Transceivers in DU 602 are coupled to transceivers in CU 603. Transceivers in CU 603 are coupled AMF 422 and UPF 426. The DSP and CPU in RU 601, DU 602, and CU 603 execute the radio applications, operating systems, and network applications to exchange data and signaling with UE 401, AMF 422, and UPF 426.

Figure 7:
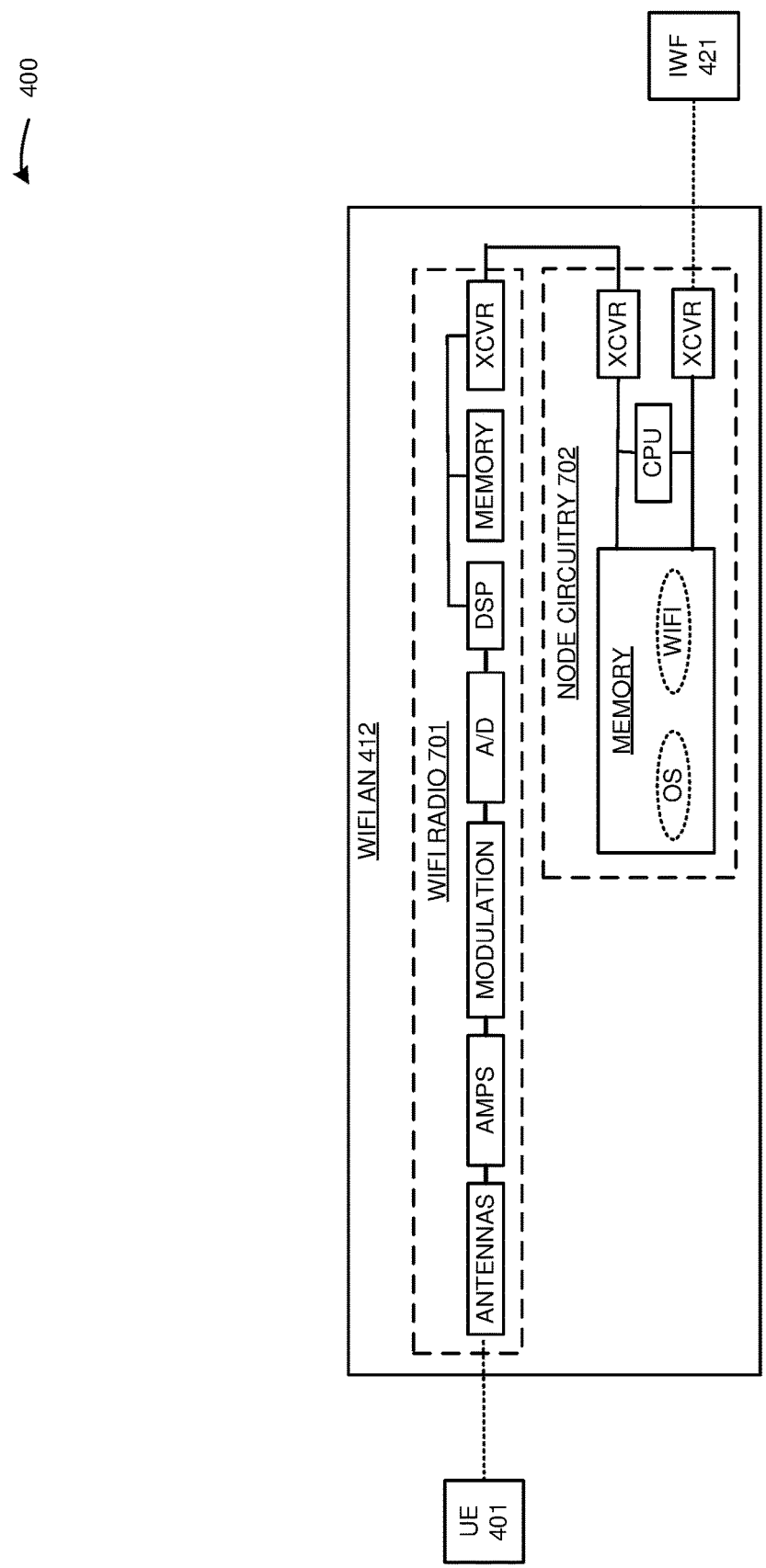
FIG. 7 illustrates an exemplary IEEE 802.11 (WIFI) AN in the 5G communication network.

FIG. 7 illustrates exemplary IEEE 802.11 (WIFI) AN 412 in 5G communication network 400. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to wireless UE 401 over a WIFI link. Transceivers in WIFI radio 701 are coupled to transceivers in node circuitry 702. Transceivers in node circuitry 702 are coupled to transceivers in IWF 421. The CPU in node circuitry 702 executes the operating system and network applications to exchange signaling and data between wireless UE 401 and IWF 421.

Figure 8:
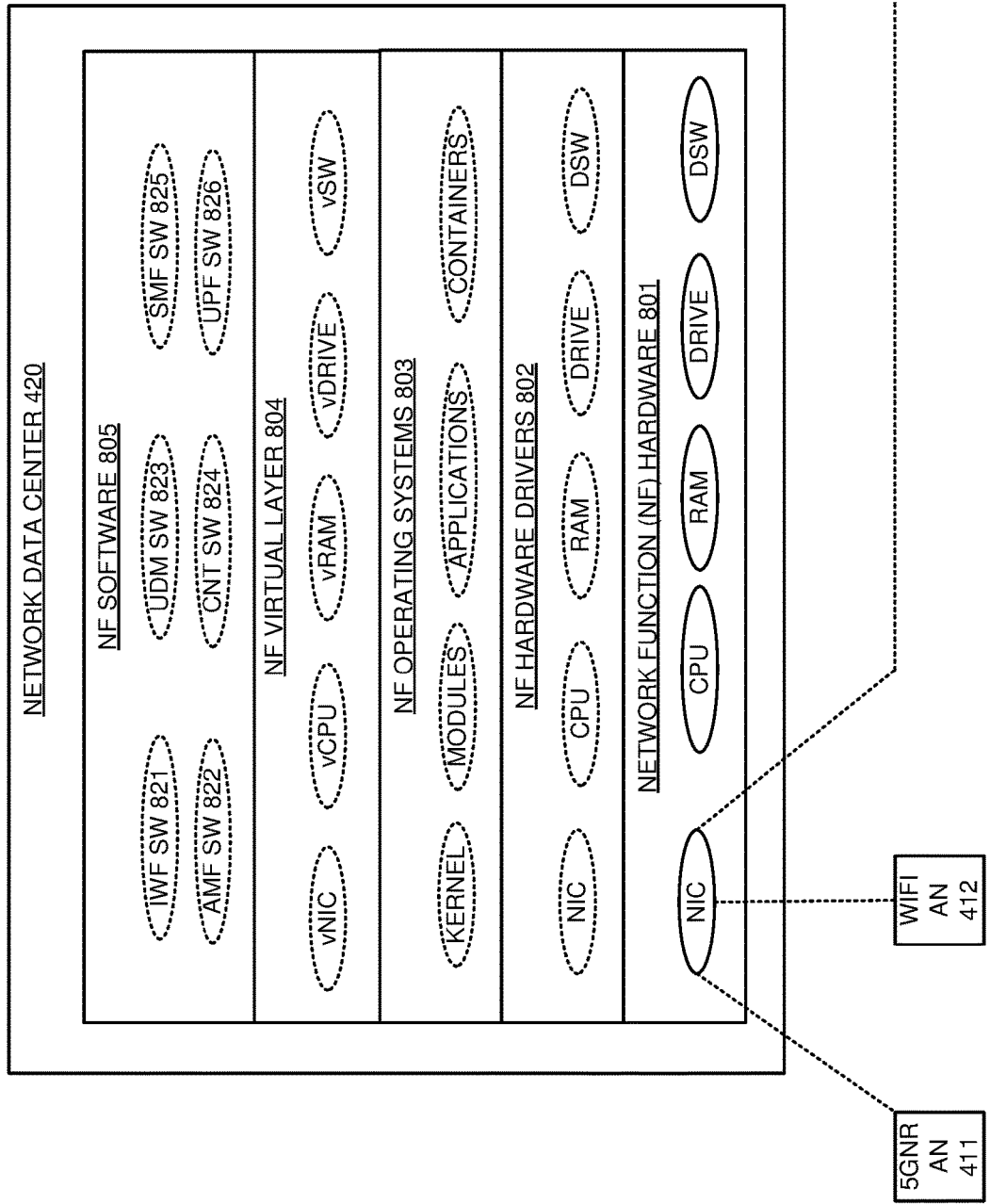
FIG. 8 illustrates an exemplary data center in the 5G communication network.

FIG. 8 illustrates exemplary data center 420 in 5G communication network 400. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SW 821, AMF SW 822, UDM SW 823, UE CNT SW 824, SMF SW 825, and UPF SW 826. Other NF SW like Network Repository Function (NRF) SW are typically present but are omitted for clarity. Network data center 420 may be located at a single site or be distributed across multiple geographic locations. The NIC in NF hardware 801 are coupled to 5GNR AN 411, WIFI AN 412, and external systems. NF hardware 801 executes NF hardware drivers 802, NF operating systems 803, NF virtual layer 804, and NF SW 805 to form and operate IWF 421, AMF 422, UDM 423, UE CNT 424, SMF 425, and UPF 426. AMF 422 exchanges N1 signaling with UE 401.

The N1 signaling from UE 401 includes information that characterizes memory calls and authorization factors. AMF 422 transfers the information to UE controller 424 over UDM 423. UE controller 424 features an AI network that has parallel inputs for the authorization factors which are scored and aggregated. The aggregate score is compared to a threshold for the requested memory call. A table may be used by UE controller 424 to translate the call type, origin, and target into a score threshold. The memory call is authorized when the aggregate score exceeds the threshold. When the aggregate score falls below the threshold, an alternative memory call may be identified or the authorization may be denied. UE controller 424 generates a memory instruction based on the AI result and transfers the memory instruction to UDM 423. UDM 423 transfers the memory instruction to AMF 422. AMF 422 transfers the memory instruction to UE 401 over N1 signaling. In some examples, UE controller 424 is integrated within AMF 422 and/or UDM 423.

Figure 9:
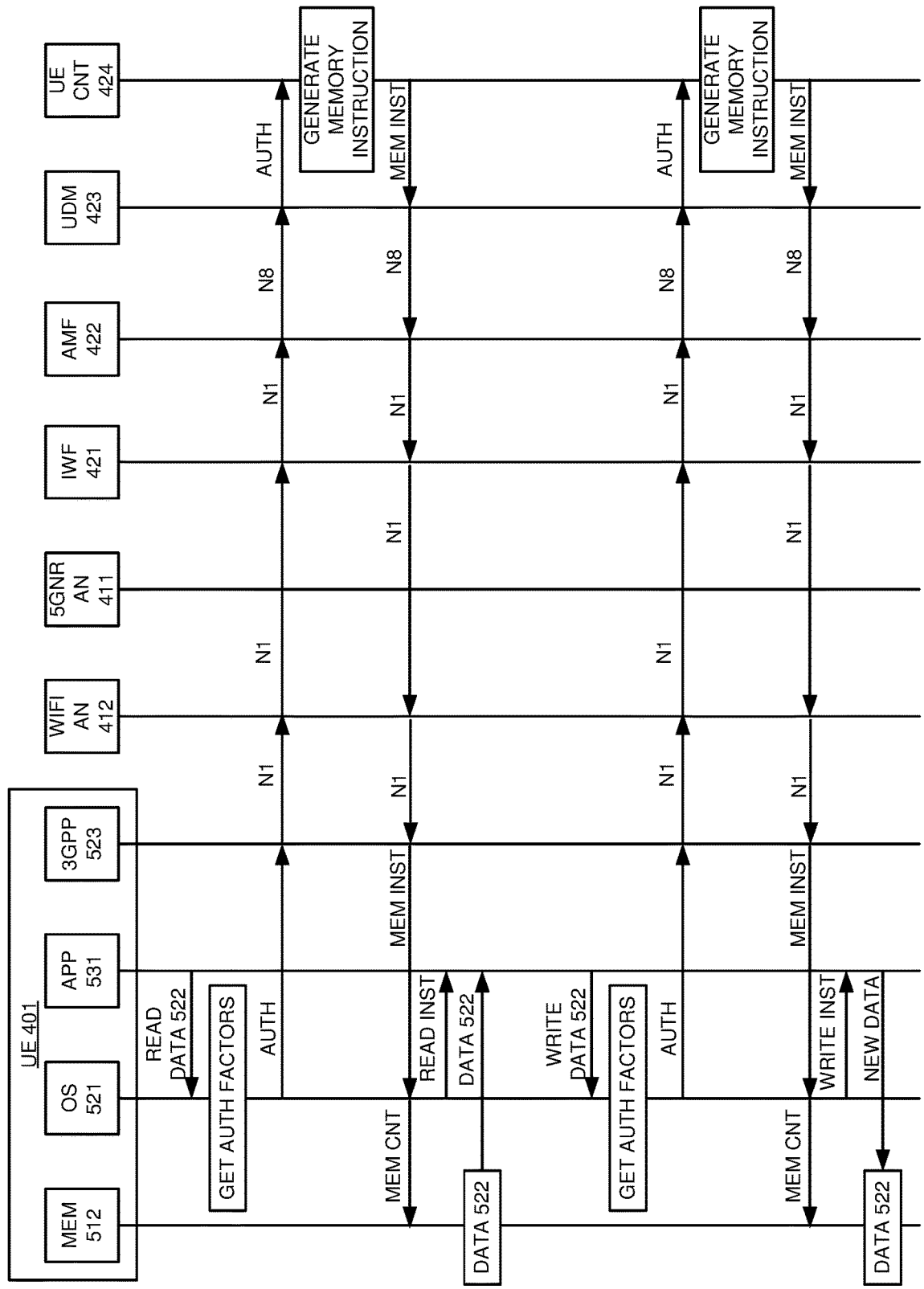
FIG. 9 illustrates an exemplary operation of the 5G communication network to serve the user application from the protected memory region.

FIG. 9 illustrates an exemplary operation of 5G communication network 400 to serve user application 531 from protected memory region 520. The operation may differ in other examples. User application 531 transfers a memory call to operating system 521 to read protected data 522 from protected memory region 520. Operating system 521 requires network authorization before unauthorized applications may access protected memory region 520. Operating system 521 may classify applications and handle memory access for user application 531 based on its application class. In response to the read call from unauthorized user application 531 for protected memory region 520, operating system 521 gathers authorization factors that are dynamically maintained in a data store. The factors indicate: digital certificates used by user application 531, memory calls from user application 531 for protected memory region 520, geographic locations for UE 401, tethered devices for UE 401 like UE 402, and network connections for UE 401. Operating system 531 transfers information that characterizes the memory call and that indicates the authorization factors to 3GPP 523. 3GPP 523 transfers the information that characterizes the memory call and that indicates the authorization factors to AMF 421 in N1 signaling that traverses WIFI AN 412 and IWF 421. AMF 421 transfers the information that characterizes the memory call and indicates the authorization factors to UDM 423 in N8 signaling. UDM 423 transfers the information that characterizes the memory call and indicates the authorization factors to UE controller 424.

UE controller 424 features an AI network that has parallel inputs for the authorization factors. The digital certificates used by user application 531 are verified and scored by age and issuer. The memory calls from user application 531 for protected memory region 520 are processed to detect and score calls based on call history and location. The geographic locations for UE 401 are processed to detect and score locations based on history and location information. The tethering information for UE 401 is processed to detect and score tethered devices based on device history and location. The network connections for UE 401 are processed to detect and score network activity based on history and location. The scores are aggregated and compared to a threshold for the requested memory call. The memory call is authorized when the aggregate score exceeds the threshold. When the aggregate score falls below the threshold, an alternative call may be identified or the authorization may be denied. UE controller 424 generates a memory instruction based on the AI result and transfers the memory instruction to UDM 423. The memory instruction may have an expiration time. UDM 423 transfers the memory instruction to AMF 422 over N8 signaling. AMF 422 transfers the memory instruction to 3GPP 523 over N1 signaling that traverses IWF 421 and WIFI AN 412. 3GPP 523 transfers the memory instruction to operating system 521.

In this example, the call is authorized so operating system 521 transfers memory control to memory circuitry 512 to implement the memory call per the memory instruction and instructs application 531 on the authorization of the read call. Memory circuitry 512 transfers protected data 522 from protected memory region 520 to user application 531 per the read call. When the call is not authorized, operating system 521 blocks the call and may recommend an alternative call.

User application 531 transfers another memory call to operating system 521 to write data to protected data 522 in protected memory region 520. Operating system 521 requires network authorization before unauthorized applications may access protected memory region 520. In response to the write call from unauthorized user application 531 to protected memory region 520, operating system 521 gathers authorization factors. Operating system 531 transfers information that characterizes the memory call and that indicates the authorization factors to 3GPP 523. 3GPP 523 transfers the information to AMF 421 in N1 signaling that traverses 5GNR AN 411. AMF 421 transfers the information to UDM 423 in N8 signaling. UDM 423 transfers the information to UE controller 424.

In UE controller 424, the digital certificates used by user application 531 are verified and scored by age and issuer. The memory calls from user application 531 for protected memory region 520 are processed to detect and score calls based on call history and the location. The geographic locations for UE 401 are processed to detect and score locations based on history and location information. The tethering information for UE 401 is processed to detect and score tethered devices based on history and location. The network connections for UE 401 are processed to detect and score network activity based on history and location. The scores are aggregated and compared to a threshold for the requested memory call. The memory call is authorized when the aggregate score exceeds the threshold. When the aggregate score falls below the threshold, an alternative call may be identified or the authorization may be denied. UE controller 424 generates a memory instruction based on the AI result and transfers the memory instruction to UDM 423. UDM 423 transfers the memory instruction to AMF 422 over N8 signaling.

AMF 422 transfers the memory instruction to 3GPP 523 over N1 signaling that traverses 5GNR AN 411. 3GPP 523 transfers the memory instruction to operating system 521. When the call is authorized, operating system 521 transfers memory control to memory circuitry 512 to implement the memory call per the memory instruction and instructs user application 531 on the execution of the write call. User application 531 transfers new data to memory circuitry 512 which writes the new data over protected data 522 in protected memory region 520.

The wireless data network circuitry described above comprises computer hardware and software that form special-purpose wireless communication device circuitry to serve user applications from protected memory regions. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication device circuitry to serve user applications from protected memory regions.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication device to serve a user application from a protected memory region, the method comprising:
   processing circuitry receiving a memory call from the user application for the protected memory region, and in response, generating network signaling that characterizes the memory call and that indicates authorization factors for the memory call, wherein the authorization factors indicate a history of device-tethering to the wireless communication device;
   communication circuitry wirelessly transferring the network signaling to a wireless communication network, and in response, wirelessly receiving additional network signaling that indicates a memory instruction from the wireless communication network;
   the processing circuitry directing memory circuitry to perform the memory call in the protected memory region for the user application per the memory instruction; and
   the memory circuitry performing the memory call in the protected memory region for the user application per the memory instruction.

2. The method of claim 1 wherein the authorization factors comprise the history of device-tethering to the wireless communication device and digital certificates from the user application.

3. The method of claim 1 wherein the authorization factors comprise the history of device-tethering to the wireless communication device and another history of memory calls from the user application for the protected memory region.

4. The method of claim 1 wherein the authorization factors comprise the history of device-tethering to the wireless communication device and a current geographic location of the wireless communication device.

5. The method of claim 1 wherein the authorization factors comprise the history of device-tethering to the wireless communication device and another history of geographic locations for the wireless communication device.

6. The method of claim 1 wherein the authorization factors indicate the history of device-tethering to the wireless communication device and another data device that is currently tethered to the wireless communication device.

7. The method of claim 1 wherein the authorization factors indicate the history of device-tethering to the wireless communication device and network connections that are currently active for the wireless communication device.

8. The method of claim 1 wherein the authorization factors indicate the history of device-tethering to the wireless communication device and another history of network connections that were active for the wireless communication device.

9. The method of claim 1 wherein the network signaling and the additional network signaling comprise Third Generation Partnership Project (3GPP) N1 signaling.

10. A wireless communication device to serve a user application from a protected memory region, the wireless communication device comprising:
    processing circuitry configured to receive a memory call from the user application for the protected memory region, and in response, generate network signaling that characterizes the memory call and that indicates authorization factors for the memory call, wherein the authorization factors indicate a history of device-tethering to the wireless communication device;
    communication circuitry configured to wirelessly transfer the network signaling to a wireless communication network, and in response, wirelessly receive additional network signaling that indicates a memory instruction from the wireless communication network;
    the processing circuitry configured to direct memory circuitry to perform the memory call in the protected memory region for the user application per the memory instruction; and
    the memory circuitry configured to perform the memory call in the protected memory region for the user application per the memory instruction.

11. The wireless communication device of claim 10 wherein the authorization factors comprise the history of device-tethering to the wireless communication device and digital certificates from the user application.

12. The wireless communication device of claim 10 wherein the authorization factors comprise the history of device-tethering to the wireless communication device and another history of memory calls from the user application for the protected memory region.

13. The wireless communication device of claim 10 wherein the authorization factors comprise the history of device-tethering to the wireless communication device and at least one of a current geographic location of the wireless communication device or another history of geographic locations for the wireless communication device.

14. The wireless communication device of claim 10 wherein the authorization factors indicate the history of device-tethering to the wireless communication device and another data device that is currently tethered to the wireless communication device.

15. The wireless communication device of claim 10 wherein the authorization factors indicate the history of device-tethering to the wireless communication device and network connections that are currently active for the wireless communication device.

16. The wireless communication device of claim 10 wherein the authorization factors indicate the history of device-tethering to the wireless communication device and another history of network connections that were active for the wireless communication device.

17. The wireless communication device of claim 10 wherein the network signaling and the additional network signaling comprise Third Generation Partnership Project (3GPP) N1 signaling.

18. One or more non-transitory computer readable storage media having program instructions stored thereon to serve a user application from a protected memory region, wherein the program instruction, when executed by a computing system, direct the computing system to perform operations, the operations comprising:
  receiving a memory call from the user application for the protected memory region;
  in response to the memory call, generating network signaling that characterizes the memory call and that indicates authorization factors for the memory call, wherein the authorization factors indicate a history of device-tethering to the wireless communication device;
  directing communication circuitry to wirelessly transfer the network signaling to a wireless communication network wherein the communication circuitry wirelessly transfers the network signaling to the wireless communication network and wirelessly receives additional network signaling that indicates a memory instruction from the wireless communication network;
  obtaining the additional network signaling that indicates the memory instruction from the communication circuitry; and
  directing memory circuitry to perform the memory call in the protected memory region for the user application per the memory instruction wherein the memory circuitry performs the memory call in the protected memory region for the user application per the memory instruction.

19. The non-transitory computer readable storage media of claim 18 wherein the authorization factors indicate the history of device-tethering to the wireless communication device and one or more of digital certificates from the user application, historical memory calls from the user application for the protected memory region, a current geographic location of the wireless communication device, historical geographic locations for the wireless communication device, another data device that is currently tethered to the wireless communication device, network connections that are currently active for the wireless communication device, or historical network connections that were active for the wireless communication device.

20. The non-transitory computer readable storage media of claim 18 wherein the network signaling and the additional network signaling comprise Third Generation Partnership Project (3GPP) N1 signaling.

* * * * *